United States Patent [19]

Sonderman

[11] 4,342,444
[45] Aug. 3, 1982

[54] BALL VALVE ASSEMBLY

[75] Inventor: William G. Sonderman, Cincinnati, Ohio

[73] Assignee: Xomox Corporation, Cincinnati, Ohio

[21] Appl. No.: 196,588

[22] Filed: Oct. 14, 1980

[51] Int. Cl.³ .............................................. F16K 5/06
[52] U.S. Cl. ................................................... 251/315
[58] Field of Search ........................................ 251/315

[56] References Cited

U.S. PATENT DOCUMENTS

| | | | |
|---|---|---|---|
| 4,136,709 | 1/1979 | Rogers et al. | 251/315 |
| 4,140,149 | 2/1979 | Laignel et al. | 251/315 |
| 4,175,726 | 11/1979 | Richards | 251/315 |
| 4,218,042 | 8/1980 | Eckel | 251/315 |

Primary Examiner—H. Jay Spiegel
Attorney, Agent, or Firm—Kinney and Schenk

[57] ABSTRACT

A ball valve assembly includes a ball valve housing formed of a single body having a passage extending therethrough with a first portion of the passage having a smaller diameter than a second portion of the passage. The second portion of the passage has an insert therein with its passage being the same diameter as the first portion of the passage. A ball valve is disposed within the housing to control flow through the passage extending through the ball valve housing. The ball valve has a spherical segment at each end of a substantially cylindrical connecting portion with each spherical segment engaging a removable seat in the passage in the valve housing. The connecting portion has a passage of the same diameter as the first portion of the passage in the valve housing with the connecting portion cut away at each end of the passage so that the periphery of the connecting portion is no greater than the inner periphery of each of the spherical segments. The connecting portion has a recess to receive a ball valve turning mechanism, which is mounted in the ball valve housing, with the recess being disposed substantially perpendicular to the longitudinal axis of the passage extending through the connecting portion.

12 Claims, 14 Drawing Figures

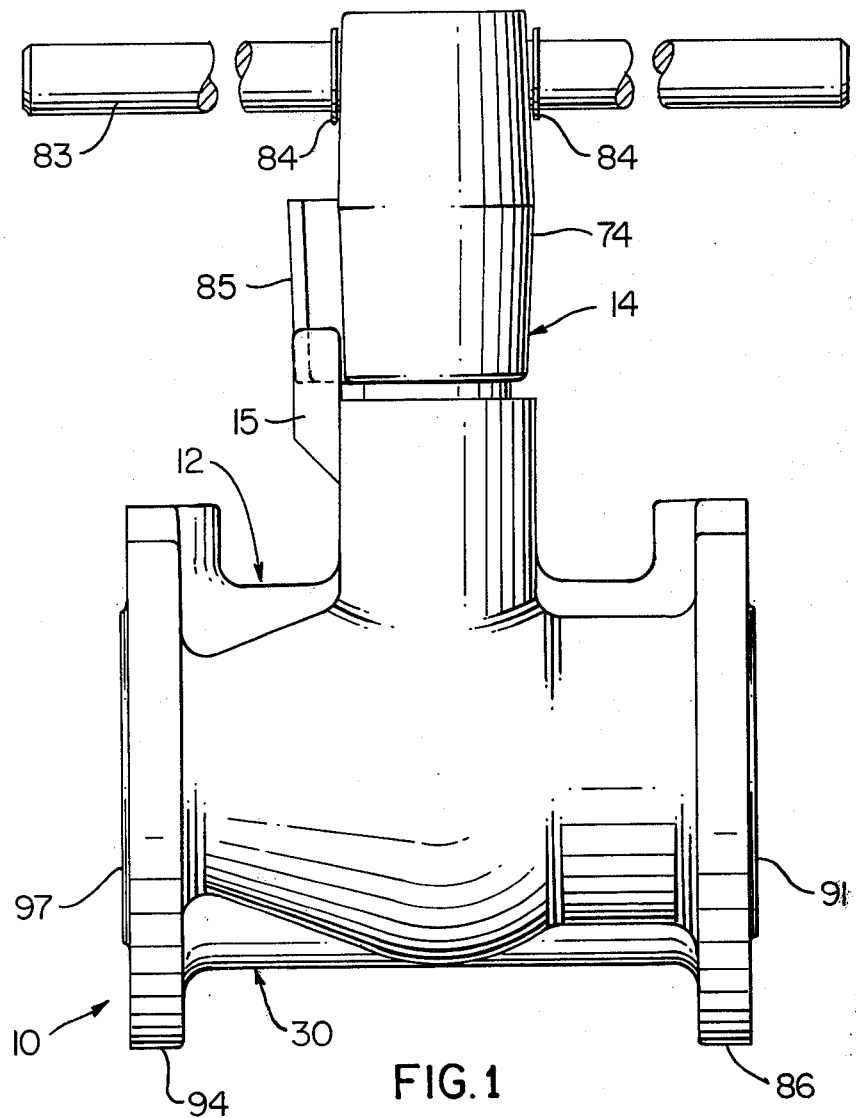
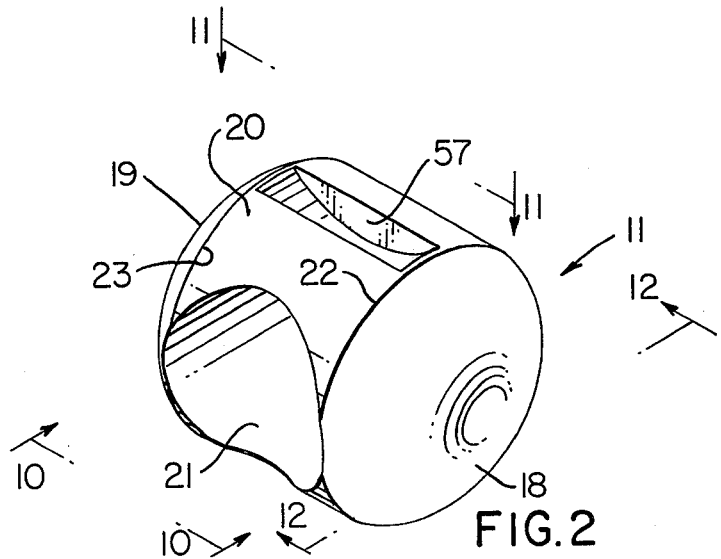

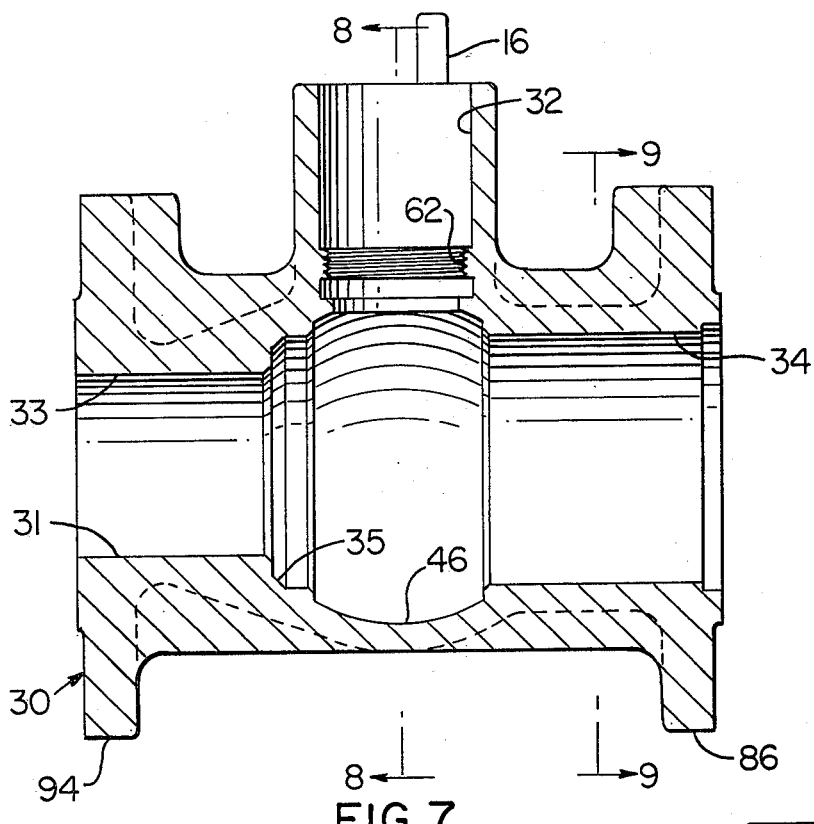
FIG. 7
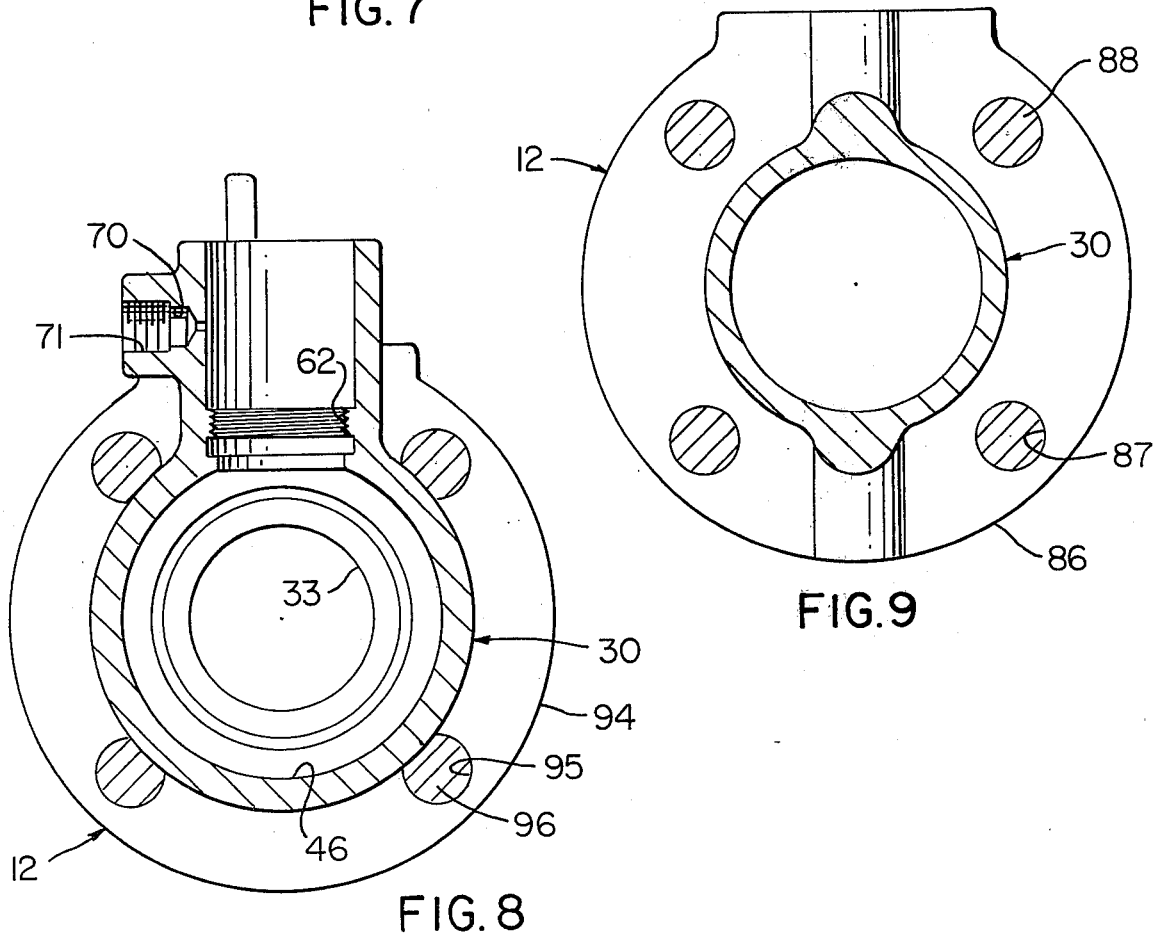
FIG. 8
FIG. 9

BALL VALVE ASSEMBLY

In a ball valve assembly, it is desired to have the passage in the ball valve of the same diameter as the passages in the valve housing with which the passage in the ball valve communicates when the ball valve is in its open position. This produces full flow so as to reduce turbulence in the flow. The full port also reduces friction and therefore reduces the energy requirement of the device.

If the passage in the ball valve is not the same diameter as the passages in the valve housing communicating therewith, there is the additional problem of not being able to extend a cleaning device through the passage in the ball valve when the ball valve assembly is utilized in a pipeline, for example, since the cleaning device is substantially the same diameter as the passages in the ball valve housing and the passages in the pipes of the pipeline. Thus, it is necessary for a ball valve in a pipeline, for example, to have its passage of the same diameter as the passages communicating therewith.

When the passage in the ball valve is of the same diameter as the passage in the valve housing with which it communicates and in which it is disposed, the spherical diameter of the ball valve is larger than the diameter of the passage in the ball valve housing. Therefore, the ball valve cannot be inserted as a single body within the ball valve housing through the passage in the ball valve housing.

One previous means of overcoming this problem has been to form the ball valve housing of two separate bodies with flanges of the two bodies being bolted together after the ball valve has been disposed in one of the bodies. This has required a gasket between the flanges and bolts and nuts to hold the flanges to each other.

The gasket has had a tendency to leak. Furthermore, when subjected to the high temperatures of a fire test as is required for a ball valve assembly utilized in a refinery or similar type pipeline, the bolts and the flanges have tended to expand and then contract on cooling so that the flanges no longer firmly engage at the joint with the gasket therebetween whereby there is leakage some time. As a result, the ball valve housing formed of two bodies has not been capable of always passing the fire test.

Even if the fire test has been passed, the tendency of leakage at the joint between the two flanges has necessitated replacement of the gasket at lesser time intervals than desired. As a result, the downtime of the pipeline has been increased.

Because of ANSI (B 16.34) standards, a ball valve housing has holes specifically located in its end flanges, which are utilized for connecting the ball valve housing to other fluid conducting elements such as pipes of a pipeline, for example, rather than to connect two bodies of the ball valve housing to each other. These specifically located holes receive bolts for connecting each of the end flanges of the ball valve housing to a flange on a pipe of the pipeline. Because of the specific locations of the holes and the use of nuts with bolts or studs to hold the ball valve housing connected to the pipes, the ball valve housing cannot be enlarged sufficiently, if the passage is greater then one inch in diameter, so that the passage in the ball valve housing can be sufficiently large to have a spherical ball valve inserted in one end thereof.

If tapped holes were utilized in the end flanges of the ball valve housing so that nuts would not have to be used behind the flange of the valve body, then the ball valve housing could be enlarged sufficiently so that the passage in the ball valve housing would be sufficiently large to receive a spherical ball valve in one end thereof. However, this would limit the use of the ball valve housing to situations where no nuts are required. Thus, for example, the ball valve housing could not be utilized at the bottom of a storage tank since assembly could not be accomplished.

Another prior means of having a passage in the ball valve of the same size as the passage in the ball valve housing has been to form the ball valve of a plurality of separate elements and insert each separately through the passage in the ball valve housing. This has required the assembly of the elements within the ball valve housing and has been a most difficult and time consuming operation. Thus, this has not been economically feasible.

The present invention satisfactorily solves the foregoing problems through providing a ball valve assembly with a ball valve having a passage or port of the same diameter as the communicating passage means in the ball valve housing without having to form the ball valve housing of two separate bodies with a joint therebetween. The ball valve assembly of the present invention also meets the ANSI standards as to the location of the holes in the end flanges.

The ball valve assembly of the present invention utilizes a single body having a passage extending therethrough with the passage at one end being larger than at the other end. This enables a ball valve, which has a spherical segment on each end for engaging a cooperating seat which may be spherical, conical or any other shape to contact the ball, to be disposed within the single body because a connecting portion between the spherical segments has a periphery no greater than the inner periphery of each of the spherical segments and less than the larger portion of the passage in the single body of the ball valve housing. Then, an insert, which has the same size passage as the passage at the other end of the ball valve housing and the passage in the ball valve, is disposed in the larger portion of the passage. This results in a passage of substantially constant size extending through the valve housing.

Through having the periphery of the connecting portion of the ball valve no greater than the inner periphery of each of the spherical segments engaging the cooperating seats within the ball valve housing, there is no necessity for enlarging the ball valve housing so that the ball valve housing can meet the ANSI standards as to the location of the holes in the end flanges and provide nut clearance around the outside of the body. Because the passage at the other end of the ball valve housing, the passage in the insert, and the passage in the ball valve are the same size, there is full flow through the ball vlave housing. There also is no difficulty in inserting a cleaning device through passages in pipes connected to each end of the ball valve housing and the passage in the ball valve housing including the passage in the ball valve because all of the passages are substantially the same size.

In a ball valve assembly, the material flowing through the passage or port in the ball valve can build up in pockets between the outer surface of the ball valve and the ball valve housing when the ball valve is closed. This may eventually prevent rotation of the ball valve.

The ball valve assembly of the present invention satisfactorily overcomes this problem through providing an arrangement in which there is flow between the ball valve and the ball valve housing and past spherical seats when the ball valve is in its open position. As a result, there is no build up of the material flowing through the ball valve housing to have any effect on moving the ball valve between its open and closed positions.

An object of this invention is to provide a unique ball valve assembly.

Another object of this invention is to provide a ball valve assembly having a ball valve housing formed of a single body with a ball valve in the ball valve housing having a full flow passage extending therethrough.

A further object of this invention is to provide a single element ball valve having a full flow passage extending therethrough.

Other objects, uses, and advantages of this invention are apparent upon a reading of the description which proceeds with reference to the drawings forming part thereof and wherein:

FIG. 1 is a front elevational view of a ball valve assembly including a ball valve of the present invention with the ball valve in its open position.

FIG. 2 is an isometric view of the ball valve of the present invention.

FIG. 7 is a sectional view of the ball valve housing of the ball valve assembly of the present invention.

FIG. 8 is a sectional view of the ball valve housing of FIG. 7 and taken along line 8—8 of FIG. 7.

FIG. 9 is a sectional view of the ball valve housing of FIG. 7 and taken along line 9—9 of FIG. 7.

Figure 3:
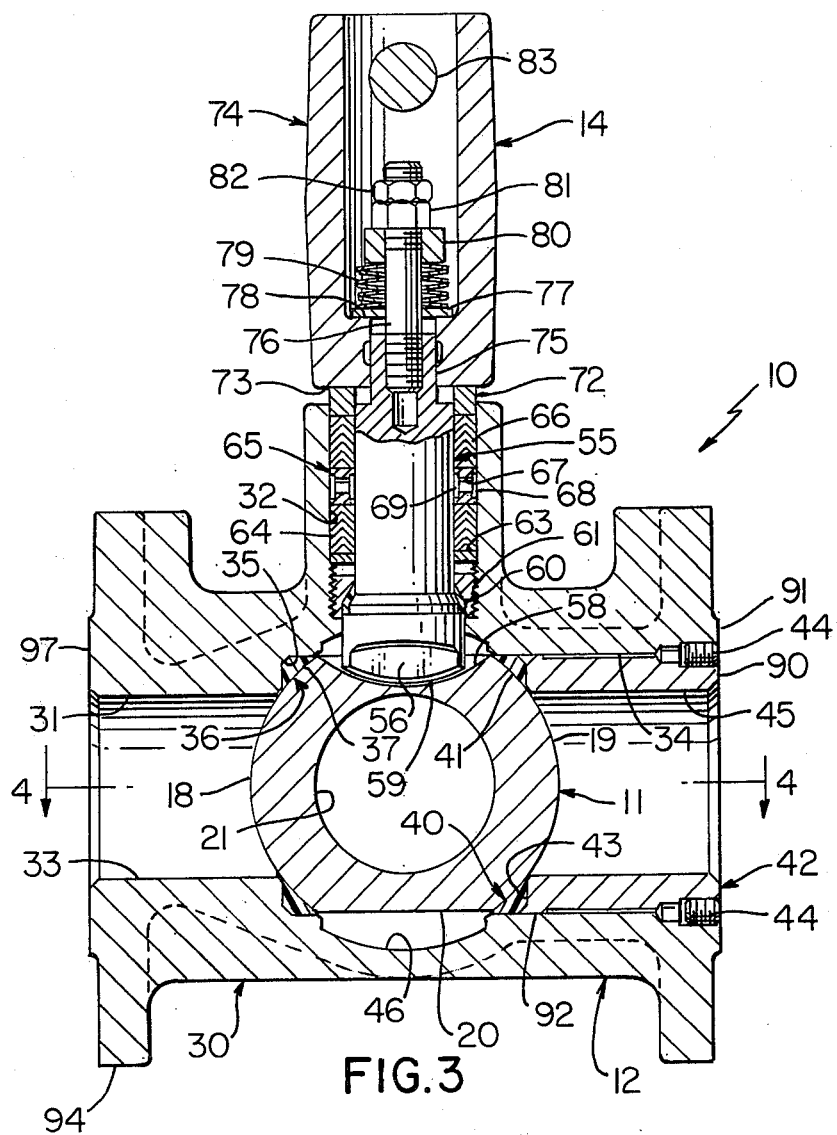
FIG. 3 is a sectional view of the ball valve assembly of FIG. 1 with the ball valve in its closed position.

Referring to the drawings and particularly FIG. 1, there is shown a ball valve assembly 10 having a ball valve 11 (see FIG. 2) disposed within a ball valve housing 12 (see FIG. 1). A turning or driven mechanism 14 rotates the ball valve 11 between its open position of FIGS. 5 and 6 and its closed position of FIGS. 3 and 4.

Figure 4:
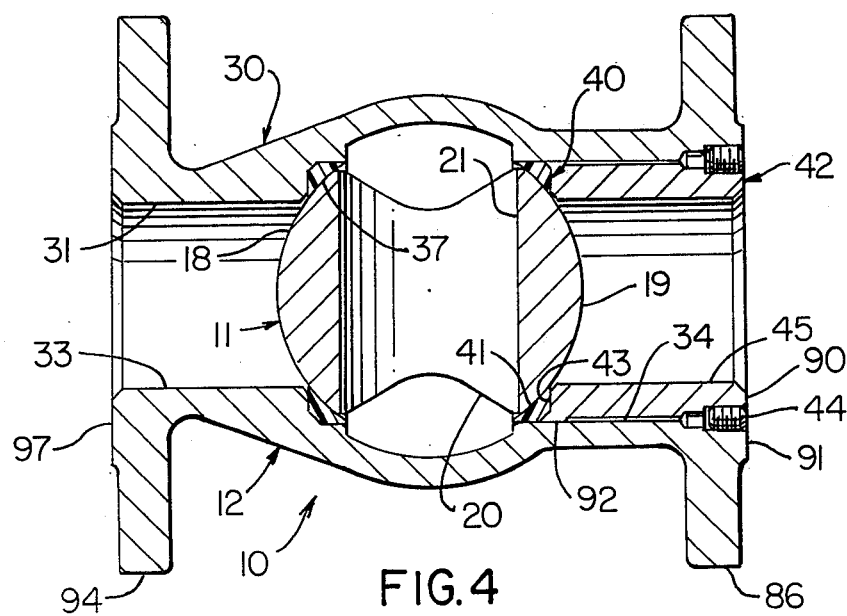
FIG. 4 is a sectional view of the ball valve assembly with the ball valve in its closed position and taken along line 4—4 of FIG. 3.
Figure 5:
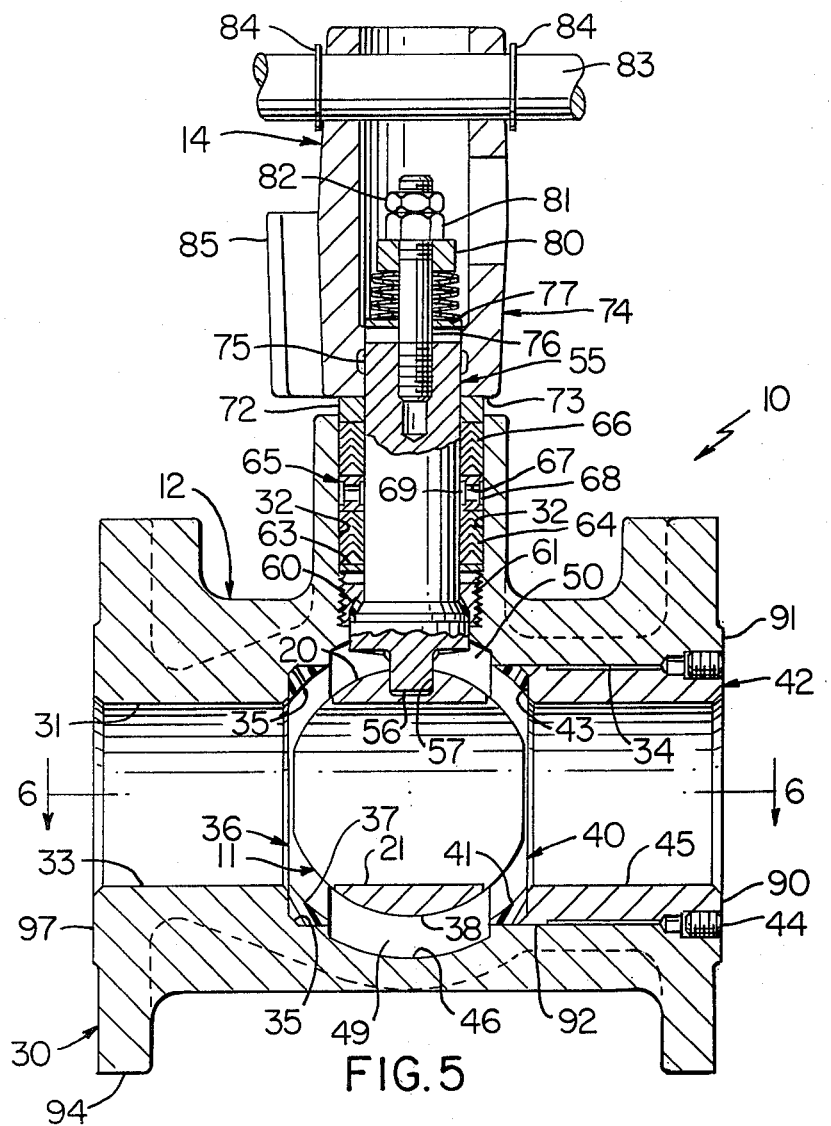
FIG. 5 is a sectional view of the ball valve assembly of FIG. 1 with the ball valve in its open position.
Figure 6:
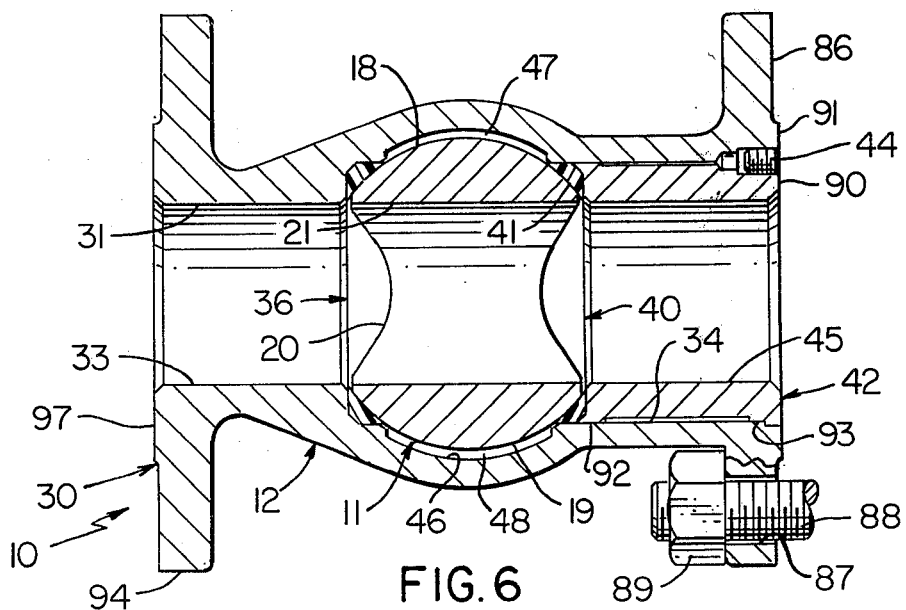
FIG. 6 is a sectional view of the ball valve assembly with the ball valve in its open position and taken along line 6—6 of FIG. 5.

The rotation of the turning mechanism 14 to move the ball valve 11 to its open position of FIGS. 1, 5, and 6 is limited by engagement with a stop 15 (see FIG. 1), which is on the ball valve housing 12. A stop 16 (see FIG. 7) is mounted on the ball valve housing 12 at 90° of rotation of the turning mechanism 14 from the stop 15 to limit rotation of the turning mechanism 14 when the ball valve 11 is moved to its closed position of FIGS. 3 and 4.

The ball valve 11 preferably comprises a single body having spherical segments 18 (see FIGS. 2, 4, 6, 10, and 11) and 19, which have a common center, at opposite ends thereof with a portion or segment 20 connecting the spherical segments 18 and 19 to each other. The connecting portion 20 has a passage or port 21 extending therethrough with its longitudinal axis passing through the common center of the spherical segments 18 and 19.

Figure 10:
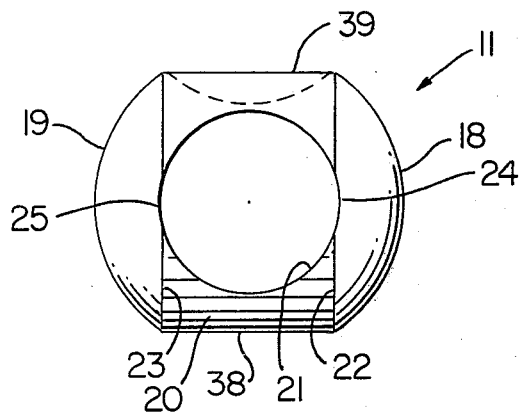
FIG. 10 is a front elevational view of the ball valve of FIG. 2 and taken along line 10—10 of FIG. 2.
Figure 11:
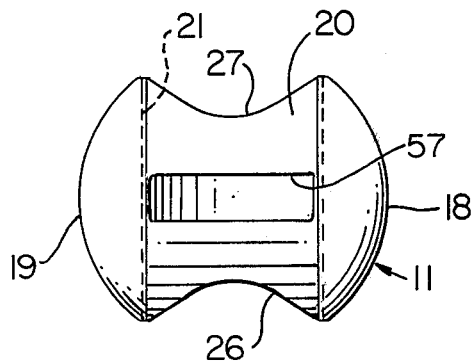
FIG. 11 is a top plan view of the ball valve of FIG. 2 and taken along line 11—11 of FIG. 2.

As shown in FIGS. 4, 6, and 11, the portion 20 has its periphery no greater than an inner periphery 22 (see FIG. 10) of the spherical segment 18 or an inner periphery 23 (see FIG. 10) of the spherical segment 19. The portion 20 has its periphery less than the inner peripheries 22 and 23 except adjacent the inner peripheries 22 and 23. Each of the spherical segments 18 and 19 is less than a hemisphere, and the inner peripheries 22 and 23 are the same.

As shown in FIGS. 10 and 11, the passage 21 is circular in cross section and of constant diameter. The diameter of the passage 21 is such that a portion of the passage 21 passes through the spherical segment 18 to cause the inner periphery 22 of the spherical segment 18 to have an arcuate portion 24 (see FIG. 10). Likewise, the inner periphery 23 of the spherical segment 19 has an arcuate portion 25 due to the intersection of the passage 21 with the spherical segment 19. A similar arrangement exists at the opposite end of the passage 21.

The portion 20 has a cutaway area 26 (see FIG. 11) at one of the ends of the passage 21 and a cutaway area 27 at the other end of the passage 21. The cutaway areas 26 and 27 of the portion 20 are along curves to produce an hourglass configuration as shown in FIG. 11.

The portion 20 is formed as a right circular cylinder between the inner peripheries 22 and 23 of the spherical segments 18 and 19, respectively, other than the cutaway areas 26 and 27. As shown in FIG. 10, the radius of the right circular cylinder is the same as the radius of the inner peripheries 22 and 23 of the spherical segments 18 and 19, respectively.

As shown in FIGS. 3-7, the ball valve housing 12 includes a single body 30 having a first longitudinal passage 31 extending therethrough and a second longitudinal passage 32 disposed with its longitudinal axis substantially perpendicular to the longitudinal axis of the passage 31 and communicating therewith. The first passage 31, which is of varying sizes, includes a first portion 33 of a first constant diameter and a second portion 34 of a second constant diameter larger than the first diameter. The second passage 32 intersects the first passage 31 between the first portion 33 and the second portion 34.

The body 30 has an annular seat surface 35 formed therein adjacent the inner end of the first portion 33 of the first passage 31 to receive a removable annular seat 36 (see FIG. 3) when the seat 36 is inserted through the second portion 34 of the first passage 31. The annular seat 36, which is formed of a suitable resilient material such as polytetrafluoroethylene, for example, has a cooperating inner surface 37, which may be spherical, conical, etc., for engaging the outer surface of the spherical segment 18 of the ball valve 11 when the ball valve 11 is in its closed position of FIGS. 3 and 4.

The maximum diameter of the cylindrical portion 20 of the ball valve 11 is the distance between surfaces 38 and 39 in FIG. 10. The surfaces 38 and 39 of the portion 20 are spaced so that they are a slightly smaller distance from each other than the diameter of the second portion 34 (see FIG. 3) of the first passage 31 in the body 30 of the ball valve housing 12. Accordingly, with the ball valve 11 in its closed position, it can be inserted within the second portion 34 of the first passage 31 in the body 30 of the ball valve housing 12 until the outer surface of the spherical segment 18 engages the cooperating inner surface 37 of the seat 36, which has previously been inserted through the second portion 34 of the first passage 31 in the body 30 of the ball valve housing 12.

Then, a second removable annular seat 40, which is formed of the same resilient material as the seat 36 and has the same shape, is inserted within the second portion 34 of the first passage 31 in the body 30 of the ball valve housing 12. The second removable seat 40 has a cooperating inner surface 41 to cooperate with the outer surface of the spherical segment 19 of the ball valve 11 to form a seat therefor.

An insert 42 is then positioned within the second portion 34 of the first passage 31 in the body 30 of the ball valve housing 12. The insert 42 has its inner end 43 shaped to support portions of the second removable seat 40, which also is partially supported by the wall of the body 30 defining the second portion 34 of the first passage 31 in the body 30 of the ball valve housing 12.

The insert 42 is retained within the body 30 by set screws 44, which cooperate with threads in both the body 30 and the insert 42. The threads are formed in the body 30 and the insert 42 by drilling and tapping the body 30 and the insert 42 after the insert 42 is disposed at the desired position in the second portion 34 of the first passage 31 in the body 30.

The insert 42 has a longitudinal passage 45 extending therethrough of substantially the same diameter as the diameter of the first portion 33 of the first passage 31 in the body 30 of the ball valve housing 12 and the diameter of the passage 21 in the ball valve 11. The passage 45 is coaxial with the first portion 33 of the first passage 31 in the body 30 and the passage 21 in the ball valve 11.

When the ball valve 11 is in its open position of FIGS. 5 and 6, the first portion 33 of the first passage 31 in the body 30 of the ball valve housing 12, the passage 21 in the ball valve 11, and the passage 45 in the insert 42 form a continuous passage of substantially the same diameter through the ball valve housing 12. Therefore, no turbulence is created by the ball valve 11 so that there is full flow through the ball valve housing 12.

The first passage 31 in the body 30 of the ball valve housing 12 has an enlarged portion 46 between the first portion 33 and the second portion 34. The enlarged portion 46 is in alignment with the second passage 32 as shown in FIG. 7.

The enlarged portion 46 constitutes a chamber. When the ball valve 11 is in its open position of FIGS. 5 and 6, a pocket 47 (see FIG. 6) is formed between the outer surface of the spherical segment 18 of the ball valve 11 and the enlarged portion 46 of the first passage 31 in the body 30, and a pocket 48 is formed between the enlarged portion 46 of the first passage 31 in the body 30 and the outer surface of the spherical segment 19 of the ball valve 11. The pockets 46 and 47 communicate with a passage 49 (see FIG. 5) beneath the ball valve 11 and a passage 50 above the ball valve 11 when the ball valve 11 is in its open position. This enables the pockets 46 and 47 to have flow therethrough so that there is no build up of any material flowing through the ball valve housing 12.

As previously mentioned, the turning or driving mechanism 14 rotates the ball valve 11 between its open and closed positions. The turning mechanism 14 includes a driving stem 55 having a tang 56 disposed in a recess 57 in the portion 20 of the ball valve 11. The recess 57 has its bottom wall 58 (see FIG. 3) curved to cooperate with a curved bottom surface 59 of the tang 56 to keep the ball valve 11 from rocking so that the spherical segments 18 and 19 do not cease to engage the removable seats 36 and 40, respectively.

Figure 13:
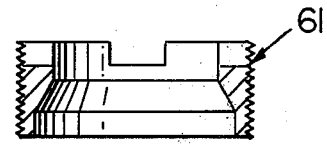
FIG. 13 is a sectional view of the bearing retainer used with the turning mechanism of the ball valve assembly of the present invention.

The stem 55 is disposed within the second passage 32 in the body 30 of the ball valve housing 12. A bearing 60, which is preferably formed of polytetrafluoroethylene or other low friction material, is held against a portion of the drive stem 55 by a bearing retainer 61. The bearing retainer 61 has its outer surface threaded, as shown in FIG. 13, to cooperate with a threaded portion 62 (see FIG. 7) in the second passage 32 in the body 30 of the ball valve housing 12.

A washer 63 (see FIG. 3) rests on top of the bearing retainer 61. A chevron packing 64 is mounted on top of the washer 63 to prevent leakage.

Figure 14:
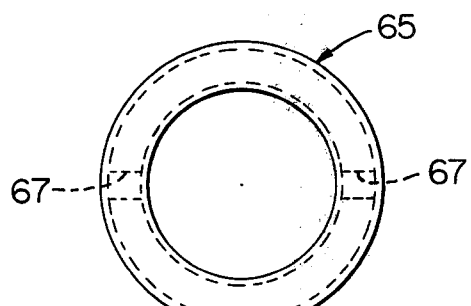
FIG. 14 is a top plan view of a lantern ring utilized with the turning mechanism of the ball valve assembly of the present invention.
Figure 12:
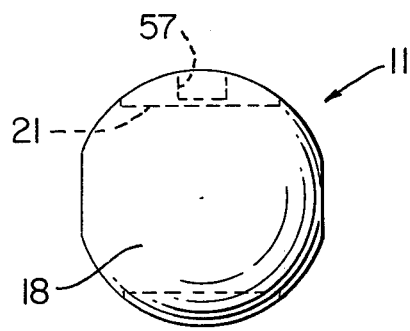
FIG. 12 is an end elevational view of the ball valve of FIG. 2 and taken along line 12—12 of FIG. 2.

A lantern ring 65 is mounted on top of the packing 64 and beneath a chevron packing 66. The lantern ring 65 has two diametrically disposed passages 67 (see FIG. 14) therein.

Each of the passages 67 communicates with an outer annular passage 68 (see FIG. 3), which is formed between the lantern ring 65 and the wall of the second passage 32 in the body 30 of the ball valve housing 12. An annular passage 69, which also communicates with each of the two diametrically disposed passages 67 in the lantern ring 65, is formed between the outer surface of the driving stem 55 and the lantern ring 65.

Thus, if there is any fluid leakage past the chevron packing 64, the fluid enters the diametrically disposed passages 67. The annular passage 68 communicates with a passage 70 (see FIG. 8) in the body 30. The passage 70 has threads 71 to receive a threaded plug, for example, which may be removed to enable detection of any leakage of the fluid flowing through the ball valve housing 12.

A gland ring 72 (see FIGS. 3 and 5) is disposed partially within the second passage 32 in the body 30 of the ball valve housing 12 above the packing 66. The gland ring 72 bears against a lower surface 73 of a hub 74, which is connected to the driving stem 55.

The driving stem 55 has a reduced portion 75 extending into the hub 74. A stud 76 is threadably connected at its lower end to the reduced portion 75 of the driving stem 55. The stud 76 has a washer 77 fitting thereover and resting on a shoulder 78 of the hub 74.

Suitable resilient means 79, which is preferably a Belleville spring, rests on top of the washer 77 and has a collar 80 engaging its upper surface. A lock nut 81 is mounted on the stud 76 against the collar 80, and a jam nut 82 is disposed above the lock nut 81. Thus, the hub 74 is secured to the driving stem 55 so that any rotation of the hub 74 is transmitted to the driving stem 55.

The turning mechanism 14 includes a handle 83, which is retained on the hub 74 by a pair of retaining rings 84 disposed in grooves in the handle 83. When the ball valve 11 is in its open position of FIGS. 1 and 5, an indicator 85, which is integral with the hub 74, engages the stop 15 as shown in FIG. 1. When the ball valve 11 is in its closed position of FIG. 3, the indicator 85 engages the stop 16 (see FIG. 7) on the body 30 of the ball valve housing 12. The stops 15 (see FIG. 1) and 16 (see FIG. 7) also function to indicate the position of the ball valve 11 (see FIG. 3) in accordance with which of the stops 15 (see FIG. 1) and 16 (see FIG. 7) is engaged by the indicator 85 (see FIG. 1).

The body 30 has a flange 86 (see FIGS. 6 and 9) at one end with a plurality of holes 87 therein. The holes 87 are arranged in accordance with the ANSI standards to enable the ball valve housing 12 to be secured in a pipeline, for example, through being connected by bolts 88 (one shown in FIG. 6) passing through holes, which are similar to the holes 87, in the flange on the end of the pipe and the holes 87 with nuts 89 (one shown in FIG. 6) to retain the bolts 88. The locations of the nuts 89 are such that the outer wall of the body 30 cannot be increased in size so that the second portion 34 of the first passage 31 could have a larger diameter to accommodate a spherical ball valve.

It should be understood that the insert 42 (see FIGS. 3-6), which is employed to exert a force on the removable seat 40 against the spherical segment 19 of the ball valve 11 when the ball valve 11 is in its closed position of FIGS. 3 and 4, is positioned within the second portion 34 of the first passage 31 in the body 30 of the ball valve housing 12 until an end surface 90 is flush with an annular surface 91, which surrounds the second portion 34 of the first passage 31 in the body 30, on the flange 86 of the body 30. The surfaces 90 and 91 function as a gasket surface for a gasket disposed between the ball valve housing 12 and the pipe, which is connected to the ball valve housing 12 through the bolts 88 (see FIG. 6) and the nuts 89.

When the insert 42 is positioned within the second portion 34 of the first passage 31 in the body 30, the insert 42 has a pair of longitudinally spaced bearing surfaces 92 and 93 on its outer surface bearing against portions of the wall of the second portion 34 of the first passage 31 in the body 30. The bearing surface 93 has the tapped holes for the set screws 44 extending therethrough.

The body 30 has a second end flange 94 at its end opposite to the end flange 86. The flange 94 has a plurality of holes 95 (see FIG. 8) arranged therein in accordance with the ANSI standards to enable the ball valve housing 12 to be secured to another of the pipes of the pipeline in which the ball valve housing 12 is disposed. The connection is made by bolts 96 (see FIG. 8) and nuts, which are the same as the nuts 89 (see FIG. 6).

The second flange 94 has an annular surface 97 surrounding the first portion 33 of the passage 31. The annular surface 97 supports a gasket, which is disposed between the body 30 of the valve housing 12 and the pipe to which the second flange 94 of the body 30 of the valve housing 12 is secured.

It should be understood that any other suitable turning or driving mechanism could be employed instead of the turning or driving mechanism 14 (see FIG. 3). It is only necessary that the turning or driving mechanism be capable of being connected to the ball valve 11 in some manner in which the ball valve 11 can be rotated through 90° without slippage to any degree of the ball valve 11 relative to the ball valve housing 12.

While the portion 20 (see FIG. 10) of the ball valve 11 has been shown and described as being a right circular cylinder, it should be understood that any other configuration could be employed as long as the maximum periphery of the portion 20 does not exceed the inner periphery 22 of the spherical segment 18 or the inner periphery 23 of the spherical segment 19. It is only necessary that the connecting portion 20 be capable of having the passage 21 therein of the same diameter as the first portion 33 (see FIG. 3) of the first passage 31 in the body 30 of the ball valve housing 12 and the passage 45 in the insert 42 and be coaxial therewith when the ball valve 11 is in its open position.

While the present invention has shown and described each of the first portion 33 and the second portion 34 of the first passage 31, the passage 45 in the insert 42, and the passage 21 in the ball valve 11 as being circular in cross section, it should be understood that such is not a requisite for satisfactory operation. It is only necessary that the first portion 33 of the first passage 31, the passage 45 in the insert 42, and the passage 21 in the ball valve 11 be of the same constant size and shape and be coaxial with each other when the ball valve 11 is in its open position. It also is only necessary that the second portion 34 of the first passage 31 and the outer surface of the insert 42 have the same configuration and that the portion 20 of the ball valve 11 be smaller than the second portion 34 of the first passage 31 so that the ball valve 11 is capable of sliding in the second portion 34 of the first passage 31 when the ball valve 11 is in its closed position.

An advantage of this invention is that a ball valve does not require a split body in order to be assembled in a ball valve housing formed of a single body. Another advantage of this invention is that there is no joint in a ball valve housing that could possibly leak and that the need for a joint gasket is eliminated. A further advantage of this invention is that it is lighter than previously available ball valve housings.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A ball valve assembly including a one-piece single body defining the entire housing structure of said valve assembly and having a passage extending therethrough; said passage including a first portion of a first constant size extending from one end of said single body and a second portion of a second constant size larger than the first constant size of said first portion of said passage extending from the other end of said single body, a first spherical seat disposed in said passage adjacent the end of said first portion of said passage, a single-piece insert disposed in said second portion of said passage, said insert being free of circumferential fastening threads and having a passage extending therethrough of the same constant size as the constant size of said first portion of said passage and coaxial therewith, means to retain said insert within said single body, a second spherical seat disposed solely in said second portion of said passage adjacent said passage in said insert, and each of said first and second spherical seats being formed of a resilient material; a ball valve disposed in said passage in said single body between said first spherical seat and said second spherical seat, said ball valve having a first spherical segment at one end for engaging said first spherical seat, a second spherical segment at its other end for engaging said second spherical seat, each of said first spherical segment and said second spherical segment being less than a hemisphere and having its inner periphery of the same length, and means connecting said first spherical segment and said second spherical segment to each other; said connecting means having its periphery no greater than the inner periphery of each of said first spherical segment and said second spherical segment; each of said first spherical segment, said second spherical segment, and said connecting means of said ball valve having its periphery smaller than the periphery of said second portion of said passage in said single body to enable insertion of said ball valve through said second portion of said passage in said single body prior to said insert being disposed in said second portion of said passage in said single body, said insert exerting a force on said second spherical seat when retained by said retaining means to exert a force on said ball valve so that said ball valve is held against said first spherical seat, said insert holding said second spherical seat in sealing engagement against said single body and against said ball valve, said second spherical seat serving the dual purpose of providing a seal between said ball valve and said single body and providing the only seal between said insert and said single body; and connecting means having a passage extending therethrough of the same constant size as said first portion of said passage in said single body and said passage in said insert; turning means supported by said single body to turn said ball valve to an open position in which said passage in said connecting means of said ball valve communicates said first portion of said passage in said single body with said passage in said insert and a closed position in which said connecting means blocks communication between said first portion of said passage in said single body and said passage in said insert; said connecting means having cooperating means to cooperate with said turning means to enable said turning means to turn said ball valve, said cooperating means not extending beyond the periphery of said connecting means and not communicating with said passage in said connecting means, said connecting means having its outer surface uninterrupted except for the ends of said passage and said cooperating means, each of said first spherical segment and said second spherical segment having its outer surface uninterrupted; said first spherical segment engaging only said first spherical seat and said second spherical segment engaging only said second spherical seat when said ball valve has been turned to its closed position in which flow cannot occur through said passage in said connecting means of said ball valve; and said single body having an end flange at each end defined as an integral part thereof, each of said end flanges having holes specifically located to enable attachment of each of said end flanges by attaching means to a similar end flange on another element having a passage extending therethrough of the same size as said first portion of said passage in said single body, said passage in said connecting means of said ball valve, and said passage in said insert.

2. The ball valve assembly according to claim 1 in which said single body has a second passage substantially perpendicular to the longitudinal axis of said passage extending through said single body and communicating therewith, and said turning means is disposed in said second passage in said single body.

3. The ball valve assembly according to claim 2 in which said ball valve is a single body and said connecting means is a substantially cylindrical segment extending between the inner periphery of said first spherical segment and the inner periphery of said second spherical segment.

4. The ball valve assembly according to claim 3 in which said substantially cylindrical segment is cut away at each end of said passage extending therethrough.

5. The ball valve assembly according to claim 4 in which said cooperating means comprises a recess in said substantially cylindrical segment to receive said turning means and disposed substantially perpendicular to the longitudinal axis of said passage extending through said substantially cylindrical segment.

6. The ball valve assembly according to claim 2 in which said first spherical segment and said second spherical segment have a common center.

7. The ball valve assembly according to claim 1 in which said ball valve is a single body and said connecting means is a substantially cylindrical segment extending between the inner periphery of said first spherical segment and the inner periphery of said second spherical segment.

8. The ball valve assembly according to claim 7 in which said substantially cylindrical segment is cut away at each end of said passage extending therethrough.

9. The ball valve assembly according to claim 8 in which said cooperating means comprises a recess in said substantially cylindrical segment to receive said turning means and disposed substantially perpendicular to the longitudinal axis of said passage extending through said substantially cylindrical segment.

10. The ball valve assembly according to claim 1 in which said first spherical segment and said second spherical segment have a common center.

11. The ball valve assembly according to claim 1 in which each of said first spherical seat and said second spherical seat is removable through said second portion of said passage extending through said body.

12. The ball valve assembly according to claim 1 including each of said end flanges of said single body having an annular protruding surface to function as a gasket surface for a gasket disposed between said single body and the element connected thereto through said end flange, said single-piece insert having its outer end surface flush with said annular protruding surface of one of said end flanges, and said single-piece insert being readily removable yet being retained within said single body by set screws extending parallel to the longitudinal axis of the passage through said single body.

* * * * *